(12) United States Patent
Jones

(10) Patent No.: US 7,886,193 B2
(45) Date of Patent: Feb. 8, 2011

(54) SYSTEM AND METHODS FOR PROCESSING SOFTWARE AUTHORIZATION AND ERROR FEEDBACK

(75) Inventor: Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 11/124,662

(22) Filed: May 9, 2005

(65) Prior Publication Data

US 2006/0253760 A1 Nov. 9, 2006

(51) Int. Cl.
*G06F 11/00* (2006.01)
(52) U.S. Cl. .............................. 714/38; 714/47; 714/48; 726/4; 726/29; 726/30
(58) Field of Classification Search ................... 714/38, 714/47, 48; 726/4, 5, 29, 30
See application file for complete search history.

(56) References Cited

U.S. PATENT DOCUMENTS

| 5,371,883 | A | * | 12/1994 | Gross et al. ................... 714/38 |
| 6,023,507 | A | * | 2/2000 | Wookey ...................... 709/224 |
| 6,714,976 | B1 | * | 3/2004 | Wilson et al. ................ 709/224 |
| 7,315,856 | B2 | * | 1/2008 | Iulo et al. ....................... 707/3 |
| 2002/0194320 | A1 | * | 12/2002 | Collins et al. ............... 709/223 |
| 2003/0028813 | A1 | * | 2/2003 | Lewis ......................... 713/202 |
| 2003/0172127 | A1 | * | 9/2003 | Northrup et al. ............. 709/219 |
| 2004/0010586 | A1 | * | 1/2004 | Burton et al. ................ 709/224 |
| 2004/0025185 | A1 | * | 2/2004 | Goci et al. ..................... 725/92 |
| 2004/0128583 | A1 | * | 7/2004 | Iulo et al. ...................... 714/25 |
| 2006/0085841 | A1 | * | 4/2006 | Chavis et al. ................... 726/4 |
| 2006/0129670 | A1 | * | 6/2006 | Mayer ........................ 709/223 |
| 2006/0224531 | A1 | * | 10/2006 | Abrahao et al. ............... 706/15 |

OTHER PUBLICATIONS

IBM Tivoli Enterprise Console reference Manual, Version 3.8 Sep. 2002 p. 58.*
Fagan, "Design and code inspections to reduce error in program development", 1976, IBM Syst, pp. 1-30.*

* cited by examiner

*Primary Examiner*—Robert Beausoliel
*Assistant Examiner*—Jeison C Arcos
(74) *Attorney, Agent, or Firm*—Woodcock Washburn LLP

(57) ABSTRACT

Software error feedback information, typically that associated with authorization failures due to operating system resource access checks, is automatically communicated to a software vendor with actions needed to prevent the software application error from occurring on the client computer. If possible, information associated with the software error is communicated to the client computer in order to mitigate the error by modifying how the client computer's operating system interacts with the software application so that the error may be avoided and user interaction minimized. Modifications may include automatically redirecting a resource request associated with the authorization failure in a manner such that authorization will be granted by the operating system and prevent the authorization failure due to the access check.

17 Claims, 4 Drawing Sheets

SYSTEM AND METHODS FOR PROCESSING SOFTWARE AUTHORIZATION AND ERROR FEEDBACK

FIELD OF THE INVENTION

The present invention relates to handling errors generated by software applications. More particularly, the present invention relates to handling errors generated by software applications in the access of operating system resources.

BACKGROUND OF THE INVENTION

With the advent of increasingly secure computer operating systems, users often encounter errors when running software applications, especially those unknown to the operating system. When those applications attempt to access various resources offered by the operating system due to increased access checks, an error message often will appear that requires the user's interaction to continue, or the application may be aborted or otherwise not be fully functional.

For example, having end-users indicate whether they trust an application that is unknown to the operating system before the operating system allows the application to run creates a number of problems. Users are typically ill-equipped to assess trustworthiness and rightfully annoyed about being inundated with such requests.

In view of the above problems, it would be beneficial to provide a system and method to process software authorization and error feedback to provide continuous improvement, with minimal user interaction, in the operation of existing software on increasingly secure operating systems having strict access checks. It would also be beneficial to provide a system that allows older or unknown software applications relative to a secure operating system to run smoothly and that minimizes the total number of user interactions required.

SUMMARY OF THE INVENTION

In view of the foregoing, the present invention provides a method for processing software application error feedback. The method comprises automatically receiving software error feedback information from a client computer and determining whether modifying how the client computer's operating system interacts with the software application will prevent a software application error associated with the software error feedback information from occurring. Also, if communicating information to the client computer that modifies how the client computer's operating system interacts with the software application will prevent the software application error from occurring, then that information may be communicated to the client computer.

In another embodiment of the present invention, a method is provided for processing software application error feedback information. Software error feedback information is automatically received from a client computer. The information comprises a particular software application in which the error occurred, information regarding a problem receiving authorization from the client computer operating system to run the software, a reason for authorization failure, and whether the software application aborted operation or continued to run with limited functionality. The next acts comprise: sorting software error feedback information according to which software applications cause the most frequent errors, examining at least one of the software applications that caused the most frequent errors in determining whether modifying how the client computer's operating system interacts with the software application will prevent a software application error associated with the software error feedback information from occurring, communicating information to the client computer that modifies how the client computer's operating system interacts with the software application if doing so will prevent the software application error from occurring, and otherwise communicating the software error feedback information to a software vendor with actions needed to prevent the software application error from occurring on the client computer.

Other features of the present invention are described below.

BRIEF DESCRIPTION OF THE DRAWINGS

The systems and methods for processing software authorizations and error feedback are further described with reference to the accompanying drawings in which.

DETAILED DESCRIPTION OF ILLUSTRATIVE EMBODIMENTS

Overview

The present invention provides systems and methods to process software application errors to minimize user interaction and continually improve the software application and operating systems on which it runs. Software error feedback information, typically that associated with authorization failures due to operating system resource access checks, is automatically communicated to a software vendor with actions needed to prevent the software application error from occurring on the client computer. If possible, information associated with the software error is communicated to the client computer in order to mitigate the error by technical means such as modifying how the client computer's operating system interacts with the software application so that the error may be avoided and user interaction minimized. Modifications may include automatically redirecting a resource request associated with the authorization failure in a manner such that authorization will be granted by the operating system and prevent the authorization failure due to the access check.

Exemplary Computer and Network Environments

Figure 1:
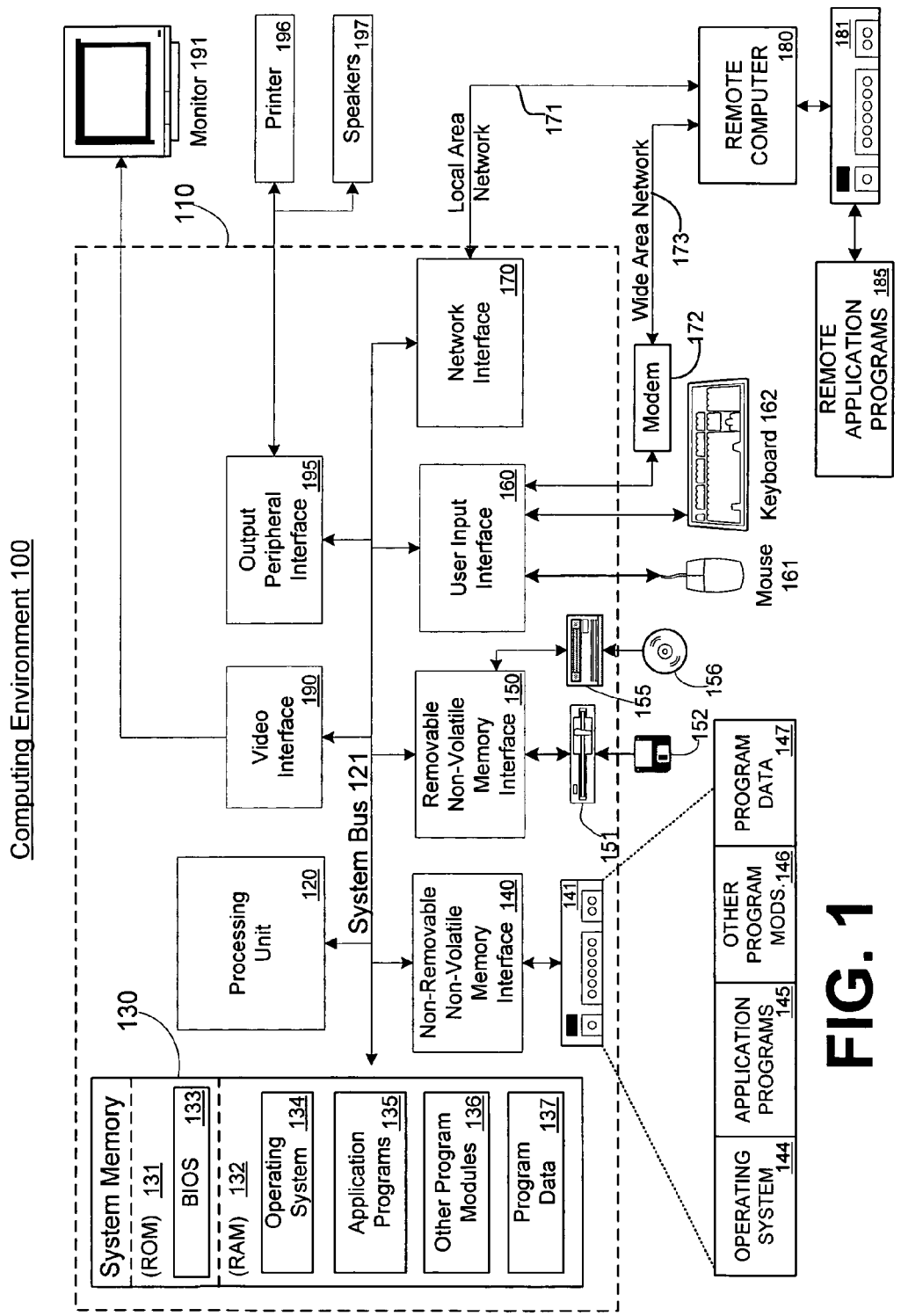
FIG. 1 is a block diagram representing a suitable computing system environment in which aspects of the present invention may be implemented.

FIG. 1 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. For example, graphics application programming interfaces may be useful in a wide range of platforms. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
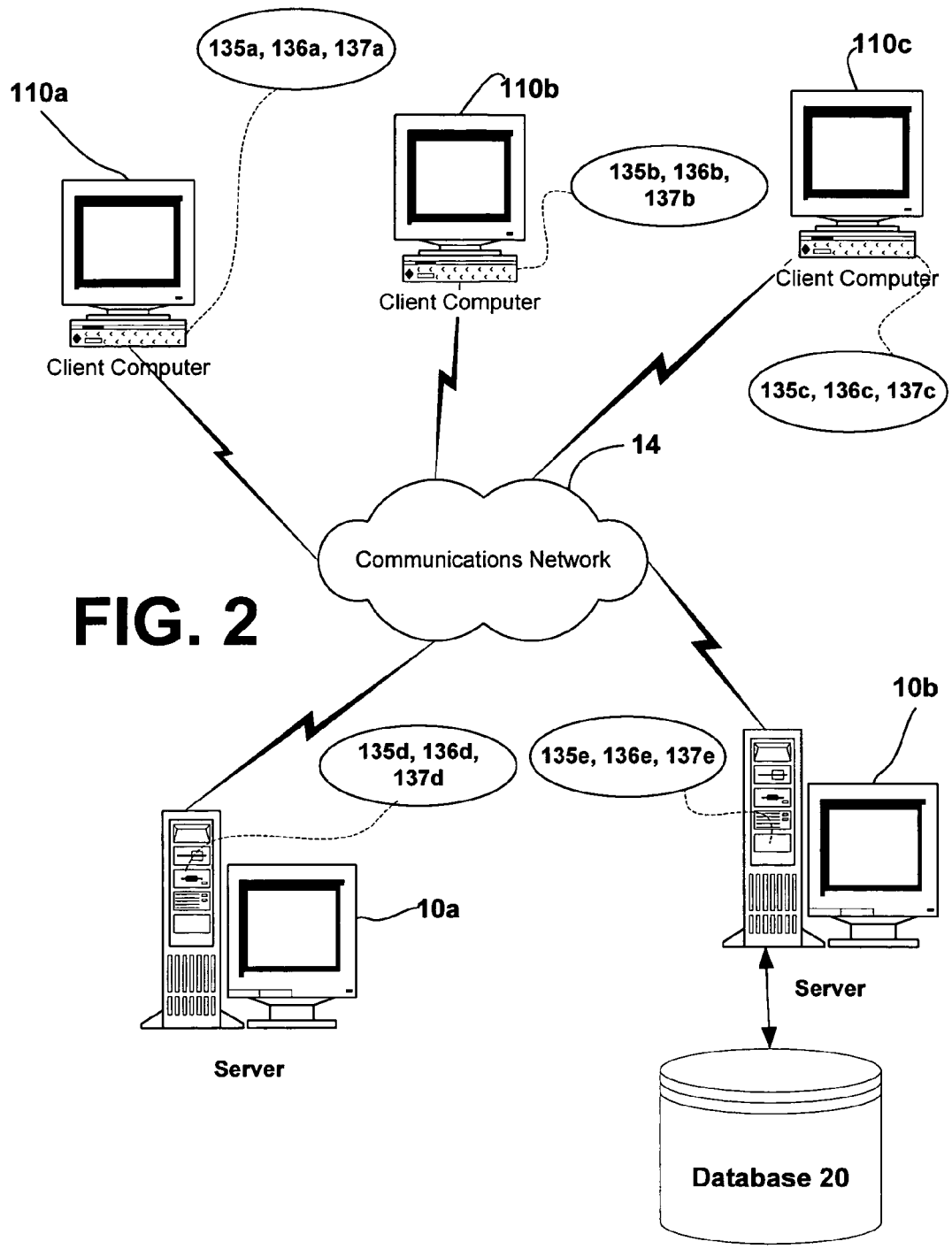
FIG. 2 is a block diagram representing an exemplary network environment in which aspects of the present invention may be implemented.

As mentioned, a computer, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. More and more, graphics applications are becoming deployed in network environments. FIG. 2 thus illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, servers 10 can be Web servers with which the clients 110a, 110b, etc. communicate via any of a number of known protocols such as hypertext transfer protocol (HTTP). The invention may also leverage peer to peer networking techniques. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Each client computer 110 and server computer 10 may also be connected to additional storage elements 20, such as a database. Thus, the present invention can be utilized in a computer network environment having client computers for accessing and interacting with a network and server computers 10a, 10b, etc. for interacting with client computers.

Figure 3:
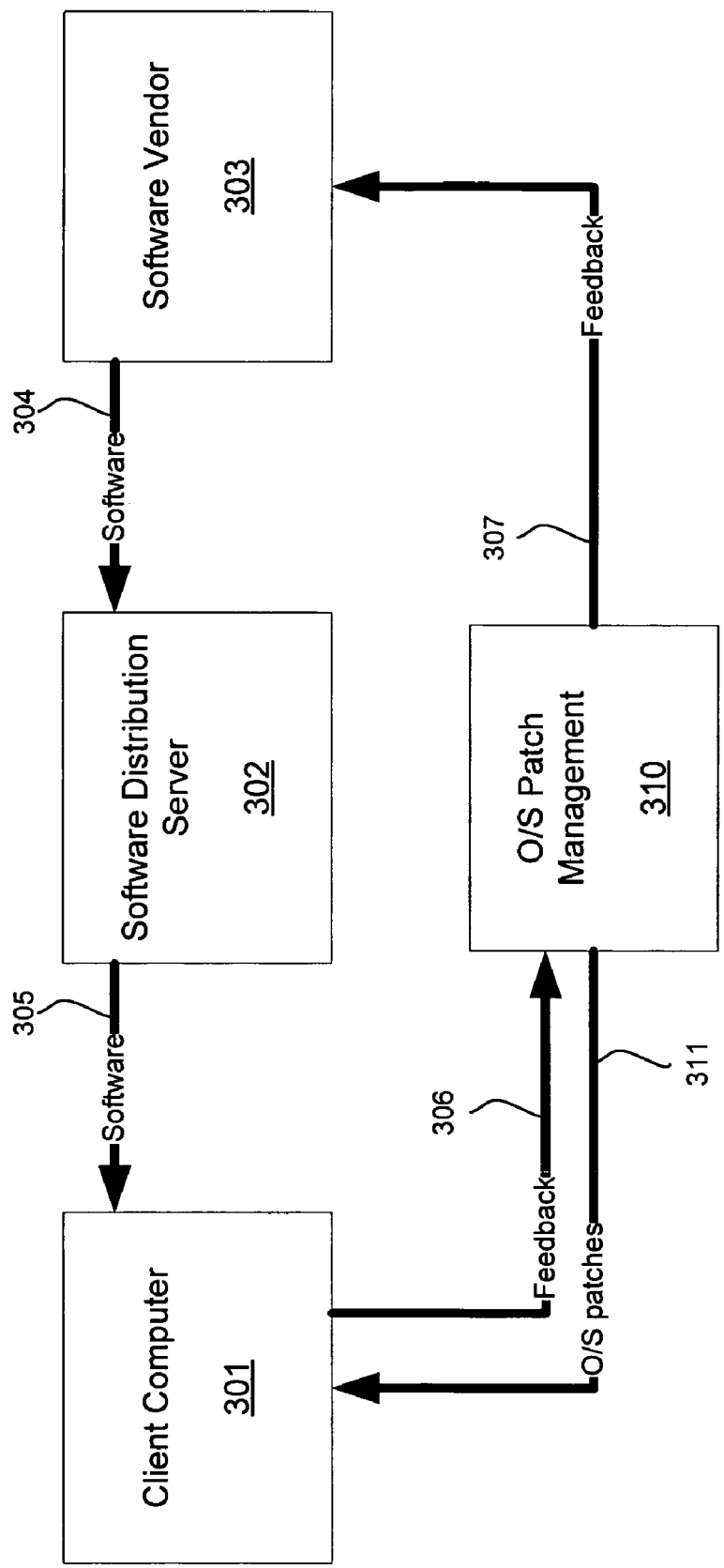
FIG. 3 is a block diagram illustrating interaction between a client computer, a software distribution server, and software vendor according to the present invention.

Referring next to FIG. 3, shown is a block diagram illustrating interaction between a client computer 301, a software distribution server 302, software vendor 303, and an operating system (o/s) patch management module according to the present invention. Software applications to be run on the client computer may originate at the software vendor site 303 or software distribution server 302. The software vendor 303 is typically the party that is selling or otherwise providing the software application under a license to the end user at the client computer site 301. This software is then forwarded 304 to a software distribution server 302 through physical transportation of software storage media or through an appropriate communication channel such as a computer network described above. The software distribution server may be co-located with the software vendor 303, or remote from the software vendor 303, but is the mechanism specialized to deliver the software to licensed end users at the client computer site 301 and typically is a repository for operating system and other software ready to be released 305 to the client computer 301, often through various automated processes.

Once the client computer 301 attempts to run the software application, but encounters an error (such as an authorization failure, for example) through the client computer's operating system that will not allow the software to run properly, feedback regarding this error is communicated 306 back to the o/s patch management module 310. The information provided 306 by the feedback includes but is not limited to: the particular application in which the error occurred, problems receiving authorization from the client computer's secure operating system to run the software, the reasons for authorization failure, and whether the software aborted operation or continued to run with limited functionality. Other relevant information pertaining to the failure may also be provided. If there was a problem with receiving authorization, this may prevent the software application from starting correctly, stop the software application from continuing to run, or allow the software application to run, but with limited functionality. An example of the reason for the authorization failure may be, for example, that the software application attempted to access a resource and received an "access denied" response. Actions, automatic or otherwise, may then be taken at the o/s patch management module 310 in response to the error feedback received 306. One such action may be to provide 305 updated or different software to the client computer to either fix the error or allow the software to run on the client computer 301 operating system. Also, the feedback may be communicated 307 to the software vendor 303 so that the software vendor may take actions in addition to or instead of those at the software distribution server 302 and provide 304 software updates, changes, or authorizations to the software distribution server 302 to transmit 305 to the client computer 301. This shows that the feedback from the client computer 301 flows to the o/s patch management service which can patch the o/s directly 311 or feedback the triaged and categorized data 307 to the software vendor 303 for their action.

Also, block 302 could be shown to have more than one instantiation. Regardless, it will be whether to patch the o/s 311 or to send the data 307 to the software vendor 303 for them to patch.

Figure 4:
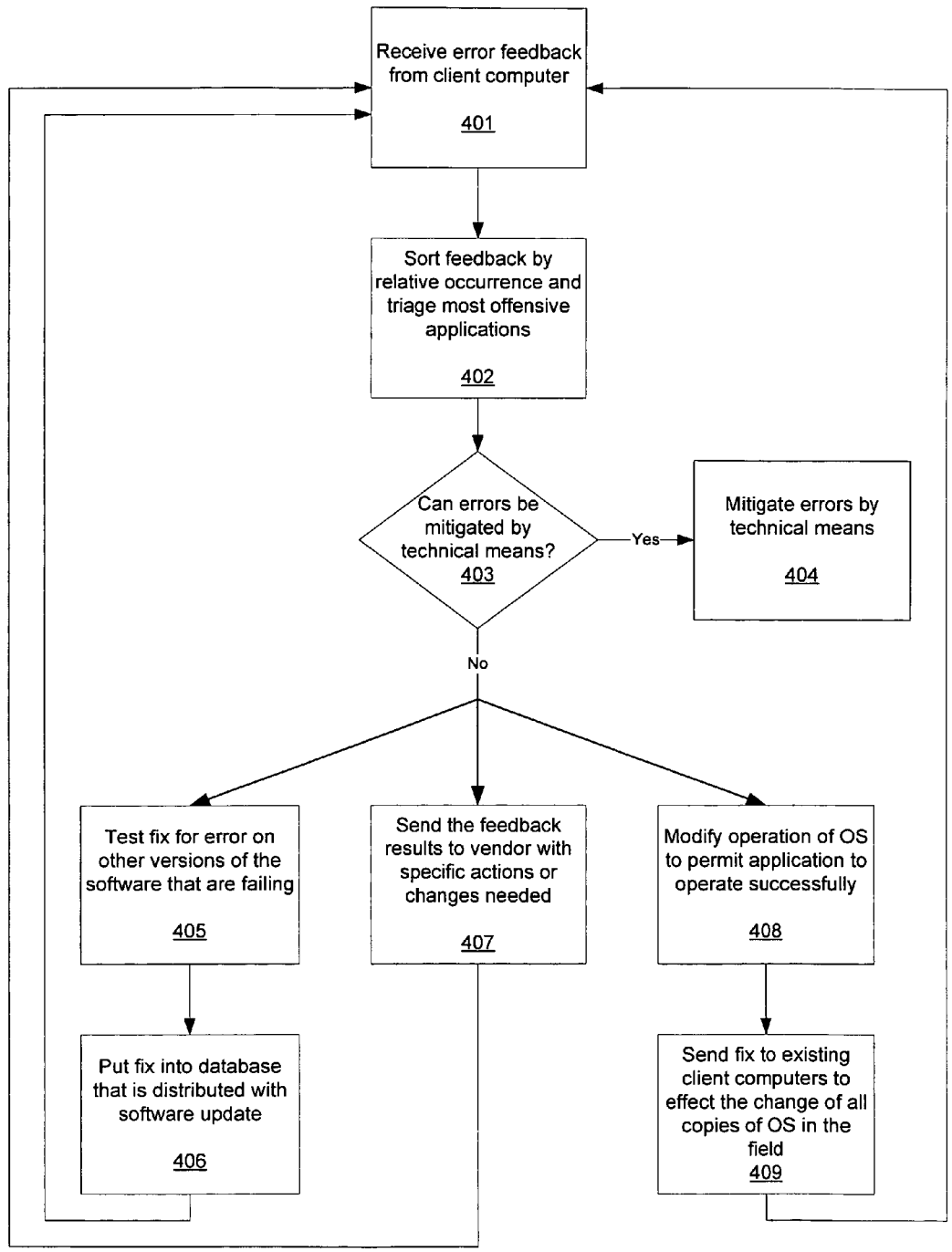
FIG. 4 is a flow chart illustrating the processing of software authorization and error feedback within the framework of FIG. 1 according to the present invention.

Referring next to FIG. 4, shown is a flow chart illustrating the processing of software authorization and error feedback within the framework of FIG. 1 according to the present invention. Once error feedback is received 401 originating from the client computer 301, it is sorted 402 by the relative occurrence of the errors and the applications with the higher rates of reported errors are classified for priority attention in a "triage" fashion, for example. It is then determined which errors can be mitigated by technical means 403. If so, the errors are mitigated by technical means 404. For example, if an error is the result of a user not having required access to a file or registry, it may be possible to re-direct a file open or registry open to a different location where the user does in fact have access. If so, such a mitigation would be implemented 404 through the communication 304 305 back to the client computer 301 and may also be automatic.

If the error can not be mitigated by technical means, then one of the following actions may be manually or automatically chosen at the software distribution server based on the feedback 306 307 provided: test a fix for the error on other versions of the software application that are failing 405 and then put the fix into a database that is distributed 305 with regular software updates 406, send 307 the feedback results to the software vendor with specific actions or changes needed 407, or as a fix, modify the operation of the client computer's operating system 408 to permit the software application to operate successfully and send 305 the fix to existing client computers to effect the change in all copies of the operating system in the field. Such a fix may be, for example, to modify the operation of the operating system file or registry virtualization to permit the software application to operate successfully. One or more of the courses of action above may be taken in response to a particular error, however, usually only one course of action would be sufficient. Other actions may also be taken as appropriate in addition to, or instead of, those listed above to minimize the time the end user at the client computer 301 must spend dealing with software authorization failures and errors.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of graphics data in a PC with a general operating system, one skilled in the art will recognize that the present invention is not limited to the PC, and that processing of software authorization and error feedback may apply to any computing device, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed:

1. A method for processing software application error feedback, the method comprising:
   automatically receiving software error feedback information regarding a software application error from a client computer upon the failure of a software application to start correctly or to continue to run with less than expected functionality; and
   determining whether modifying how the client computer's operating system interacts with the software application will prevent a software application error associated with the software error feedback information from occurring, wherein the software application with higher rates of reported errors is classified for priority attention and action to mitigate error conditions identified in the error feedback by technical or manual action;
   sending the software application error information to a software vendor with specific actions or changes needed in the software application;
   if information associated with the software error is not communicated to the client computer in order to modify how the client computer's operating system interacts with the software application, testing a fix for the software application error on different versions of the software application that are generating a similar error; and
   sending the fix to all existing client computers in the field, wherein:
   the software error feedback information is generated as a result of a software authorization failure upon attempting to start a software application; and
   the software application continues to operate after the authorization failure occurs.

2. The method of claim 1 further comprising:
   communicating information to the client computer that modifies how the client computer's operating system interacts with the software application if doing so will prevent the software application error from occurring.

3. The method of claim 2 further comprising:
   communicating the software error feedback information to a software vendor with actions needed to prevent the software application error from occurring on the client computer, if information associated with the software error is not communicated to the client computer in order to modify how the client computer's operating system interacts with the software application.

4. The method of claim 2 wherein the software error feedback information is information regarding an authorization failure due to an access check on the client computer and the information communicated to the client computer that modifies how the client computer's operating system interacts with the software application automatically redirects a resource request associated with the authorization failure in a manner such that authorization will be granted by the operating system and prevent the authorization failure due to the access check.

5. The method of claim 4 wherein the resource request is the opening of a file.

6. The method of claim 5 wherein the resource request is the accessing of an operating system registry.

7. A computer readable storage medium with computer executable instructions stored thereon for processing software application error feedback, comprising:
  automatically receiving software error feedback information from a client computer upon the failure of a software application to start correctly or to continue to run with less than expected functionality;
  determining whether modifying how the client computer's operating system interacts with the software application will prevent a software application error associated with the software error feedback information from occurring; wherein the software application with higher rates of reported errors is classified for priority attention and action to mitigate error conditions identified in the error feedback by technical or manual action;
  sending the software application error information to a software vendor with specific actions or changes needed in the software application;
  if information associated with the software error is not communicated to the client computer in order to modify how the client computer's operating system interacts with the software application, testing a fix for the software application error on different versions of the software application that are generating a similar error; and
  sending the fix to all client computers in the field, wherein:
    the software error feedback information is generated as a result of a software authorization failure upon attempting to start a software application; and
    the software application continues to operate after the authorization failure occurs.

8. The computer readable storage medium with computer executable instructions of claim 7 further comprising:
  communicating information to the client computer that modifies how the client computer's operating system interacts with the software application if doing so will prevent the software application error from occurring.

9. The computer readable storage medium with computer executable instructions of claim 8 further comprising:
  communicating the software error feedback information to a software vendor with actions needed to prevent the software application error from occurring on the client computer, if information associated with the software error is not communicated to the client computer in order to modify how the client computer's operating system interacts with the software application.

10. The computer readable storage medium with computer executable instructions of claim 8 further comprising:
  wherein the software error feedback information is information regarding an authorization failure due to an access check on the client computer and the information communicated to the client computer that modifies how the client computer's operating system interacts with the software application automatically redirects a resource request associated with the authorization failure in a manner such that authorization will be granted by the operating system and prevent the authorization failure due to the access check.

11. The computer readable storage medium with computer executable instructions of claim 10 wherein the resource request is the opening of a file.

12. The computer readable storage medium with computer executable instructions of claim 11 wherein the resource request is the accessing of an operating system registry.

13. A system for processing software application error feedback comprising:
  means for receiving software error feedback information from a client computer upon the failure of a software application to start correctly or to continue to run with less than expected functionality; and
  means for determining whether modifying how the client computer's operating system interacts with the software application will prevent a software application error associated with the software error feedback information from occurring, said determining means in communication with said receiving means;
  means for classifying the software application with higher rates of reported errors for priority attention and actions and mitigating error conditions identified in the error feedback through technical or manual means;
  means for sending the software application error information to a software vendor with specific actions or changes needed in the software application;
  means for, if information associated with the software error is not communicated to the client computer in order to modify how the client computer's operating system interacts with the software application, testing a fix for the software application error on different versions of the software application that are generating a similar error;
  means for sending the fix to all client computers in the field, said testing and putting means in communication with the error feedback receiving means; and
  means for generating the software error feedback information as a result of a software authorization failure upon attempting to start a software application, wherein the software application continues to operate after the authorization failure occurs.

14. The system of claim 13 further comprising:
  means for communicating information to the client computer that modifies how the client computer's operating system interacts with the software application if doing so will prevent the software application error from occurring, said client computer communicating means in communication with the determining means.

15. The system of claim 14 further comprising:
  means for communicating the software error feedback information to a software vendor with actions needed to prevent the software application error from occurring on the client computer, if information associated with the software error is not communicated to the client computer in order to modify how the client computer's operating system interacts with the software application, said software vendor communicating means in communication with the error feedback receiving means.

16. The system of claim 14 wherein the software error feedback information is information regarding an authorization failure due to an access check on the client computer and the information communicated to the client computer that modifies how the client computer's operating system interacts with the software application automatically redirects a resource request associated with the authorization failure in a manner such that authorization will be granted by the operating system and prevent the authorization failure due to the access check.

17. A method for processing software application error feedback comprising:

automatically receiving software error feedback information from a client computer as a result of an authorization failure upon attempting to start a software application, the information comprising: a particular software application in which the error occurred, information regarding a problem receiving authorization from the client computer operating system to run the software, a reason for authorization failure, and whether the software application aborted operation or continued to run with limited functionality;

sorting software error feedback information according to which software applications cause the most frequent errors;

examining at least one of the software applications that caused the most frequent errors in determining whether modifying how the client computer's operating system interacts with the software application will prevent a software application error associated with the software error feedback information from occurring in mitigation of error conditions identified in the error feedback;

prioritizing those software applications causing the most frequent errors for priority repair attention and actions using technical or manual operations;

communicating information to the client computer that modifies how the client computer's operating system interacts with the software application if doing so will prevent the software application error from occurring; and communicating the software error feedback information to a software vendor with specific actions needed in the software application to prevent the software application error from occurring on the client computer, if information associated with the software error is not communicated to the client computer in order to modify how the client computer's operating system interacts with the software application, wherein the software application with higher rates of reported errors is classified for priority attention; and sending any modification to all client computers in the field, wherein the software error feedback information is generated as a result of a software authorization failure upon attempting to start a software application, and the software application continues to operate after the authorization failure occurs.

* * * * *